US009152240B2

(12) United States Patent
Yeh (10) Patent No.: US 9,152,240 B2
(45) Date of Patent: Oct. 6, 2015

(54) METHOD FOR PREVIEWING OUTPUT CHARACTER AND ELECTRONIC DEVICE

(75) Inventor: Wen-Han Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 779 days.

(21) Appl. No.: 12/560,434

(22) Filed: Sep. 16, 2009

(65) Prior Publication Data

US 2010/0130256 A1    May 27, 2010

(30) Foreign Application Priority Data

Nov. 27, 2008    (TW) ................................ 97146026 A (51) Int. Cl.
*G06F 3/048* (2013.01)
*G06F 3/023* (2006.01)
*G06F 3/0488* (2013.01)

(52) U.S. Cl.
CPC .......... *G06F 3/0233* (2013.01); *G06F 3/04886* (2013.01); *H04M 2250/70* (2013.01)

(58) Field of Classification Search
CPC .................................................. G06F 3/0233
USPC .......................................................... 715/816
See application file for complete search history.

(56) References Cited

U.S. PATENT DOCUMENTS 5,530,795 A  * 6/1996 Wan .............................. 715/759
6,686,902 B2 * 2/2004 Lee .............................. 345/157
7,656,316 B2 * 2/2010 Lazaridis et al. ............... 341/22
2004/0018858 A1  1/2004 Nelson
2010/0066764 A1 * 3/2010 Refai ........................... 345/660

FOREIGN PATENT DOCUMENTS

| CN | 101174190 | 5/2008 |
|---|---|---|
| TW | 200426612 | 12/2004 |
| TW | 200520523 | 6/2005 |
| TW | 200715168 | 4/2007 |

OTHER PUBLICATIONS

Pogue, The Missing iPhone Manual, Aug. 2008, 2$^{nd}$ Edition, p. 24.*
"First Office Action of China Counterpart Application", issued on Apr. 26, 2011, p. 1-p. 5.
"Office Action of Taiwan Counterpart Application", with English translation thereof issued on Jul. 25, 2012, p. 1-p. 12.

* cited by examiner

*Primary Examiner* — Matthew Ell
(74) *Attorney, Agent, or Firm* — Jianq Chyun IP Office (57) ABSTRACT

A method for previewing an output character, and an electronic device are provided. In the present method, at least one touch signal generated by pressing at least one of the keys of a software input panel (SIP) is received. Then, an impending output character corresponding to the pressed key is determined from all relative characters thereof. Finally, showing a display window including at least the output character, and a display format of the output character in the display window is changed to specifically indicate the output character. As a result, the correctness of the pressed key on the SIP can be determined easily, and whether the impending output character is the expected character can be confirmed at the same time.

16 Claims, 6 Drawing Sheets

FIG. 1

| 1<br>@·?, | 2<br>abc | 3<br>def |
|---|---|---|
| 4<br>ghi | 5<br>jkl | 6<br>mno |
| 7<br>pqrs | 8<br>tuv | 9<br>wxyz |
| Caps<br>Shift | 0 | 123<br>Sym |

FIG. 2A

| !<br>qw | 1<br>er | 2<br>ty | 3<br>ui | ·<br>op |
|---|---|---|---|---|
| ?<br>as | 4<br>df | 5<br>gh | 6<br>jk | ,<br>l |
| @<br>zx | 7<br>cv | 8<br>bn | 9<br>m | ← |
| Shift | XT9 | 0<br>Space | Sym | ← |

METHOD FOR PREVIEWING OUTPUT CHARACTER AND ELECTRONIC DEVICE

CROSS-REFERENCE TO RELATED APPLICATION

This application claims the priority benefit of Taiwan application serial No. 97146026, filed on Nov. 27, 2008. The entirety of the above-mentioned patent application is hereby incorporated by reference herein and made a part of this specification.

BACKGROUND OF THE INVENTION

1. Field of the Invention

The present invention relates to an application of a software input panel (SIP) and more particularly, to a method for previewing an output character, and an electronic device.

2. Description of Related Art

With the blooming development in the touch sensing technology, more and more electronic devices are adopting a touch screen in place of a conventional screen and a physical keyboard as an interface to both display an image and allow a user to input a message. The SIP is a technology developed to enable a user to directly input texts or symbols to an electronic device via a touch screen.

The major difference in operation between the SIP and the physical keyboard lies in the following. When the user presses a key on the physical keyboard, he/she is able to feel a feedback from the touch of his/her fingertips, which, in association with instant viewing of the text output on the screen, allows the user to quickly determine if a correct key has been pressed. However, the SIP does not provide such a touch feedback. In addition, the image of the SIP may easily be obstructed by the user's fingers during operation. Hence, it is required to provide a suitable visual feedback effect to prompt the user regarding relevant information of key operations.

Among the current visual feedback effects designed for the SIP, the most common one is that when the user presses a key, the pressed key is highlighted. The highlight effect lasts for a period of time so when the user releases his/her finger, he/she may still see the key that was pressed via the highlight effect. However, in the case where a key may be used to output several characters, merely highlighting the pressed key does not effectively prompt the user which character is to be outputted, causing inconvenience for the user during operation.

SUMMARY OF THE INVENTION

In light of the above, the present invention provides a method for previewing an output character for prompting the user the character to be outputted when a key on the SIP is pressed.

The present invention provides an electronic device which displays all characters corresponding to a key and particularly indicates the character to be outputted when the user presses the key on the SIP.

To attain the abovementioned and other objectives, the present invention provides a method for previewing an output character suitable for an electronic device displaying an SIP. The SIP includes several keys, each for outputting at least one character. In the method, first, at least one touch signal generated by pressing one or more keys is received. Next, an output character about to be subsequently outputted is determined from all characters corresponding to each key that is pressed. A display window including at least the output character is then shown and a display format of the output character in the display window is changed to specifically indicate the output character.

In one embodiment of the present invention, the step of determining the output character from all the characters corresponding to each of the pressed keys includes determining the output character about to be outputted according to an input method currently set up in the electronic device.

In one embodiment of the present invention, when the input method is a multi-tap input method, the step of determining the output character includes calculating a number of times of consecutively receiving touch signals and then determining the output character according to the number of times.

In one embodiment of the present invention, when the input method is a long-press input method, the step of determining the output character includes obtaining a preset character as the output character. The preset character is one of the characters corresponding to the key.

In one embodiment of the present invention, the display window includes all characters corresponding to a key.

In one embodiment of the present invention, the step of changing the display format of the output character to specifically indicate the output character includes magnifying a font size of the output character so that the font size of the output character is different from that of the other characters in the display window.

In one embodiment of the present invention, the step of changing the display format of the output character to specifically indicate the output character includes changing a font color of the output character so that the font color of the output character is different from that of the other characters in the display window.

In one embodiment of the present invention, the step of showing the display window includes showing the display window in an area outside the SIP or directly showing the display window in an area overlapping an area displaying the pressed key. In the latter case, the shown display window is transparent.

In one embodiment of the present invention, the SIP includes a compact QWERTY keyboard, a phone keypad and so forth.

From another aspect, the present invention provides an electronic device including a touch screen, an output character determining module, and an output character preview module. The touch screen is for displaying an SIP which includes a plurality of keys, each used for outputting at least one character. The output character determining module is connected with the touch screen for receiving from the touch screen at least one touch signal generated by the user pressing one or more of the keys. An output character about to be subsequently outputted is determined from all the characters corresponding to all the keys that are pressed. The output character preview module is respectively connected to the output character determining module and the touch screen for showing a display window including at least the output character and changing a display format of the output character to specifically indicate the output character.

In one embodiment of the present invention, the output character determining module determines the output character about to be outputted according to the current input method set up in the electronic device.

In one embodiment of the present invention, when the input method is a multi-tap input method, a number of times of consecutively receiving touch signals is calculated and then the output character is determined according to the number of times.

In one embodiment of the present invention, when the input method is a long-press input method, a preset character is obtained as the output character. The preset character is one of the characters corresponding to the key.

In one embodiment of the present invention, the display window includes all characters corresponding to the key.

In one embodiment of the present invention, the output character preview module, magnifies a font size of the output character so that the font size of the output character is different from that of the other characters in the display window.

In one embodiment of the present invention, the output character preview module changes a font color of the output character so that the font color of the output character is different from that of the other characters in the display window.

In one embodiment of the present invention, the display window is transparent. The output character preview module shows the display window in an area outside an SIP or directly shows the display window in an area overlapping an area displaying the pressed key.

In one embodiment of the present invention, the SIP includes a compact QWERTY keyboard and a phone keypad.

When the user presses a key on the SIP, in addition to displaying all characters corresponding to the pressed key, the impending output character is specifically indicated by changing the display format of the output character in the present invention. Accordingly, the user can easily determine if the correct key has been pressed and may also know the output character corresponding to the key in advance.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Since sizes and numbers of keys on a software input panel (SIP) are limited to a size of a screen, a key on the SIP often corresponds to more than one output character. If a mechanism can be developed to allow a user to quickly determine whether the character to be outputted by the pressed key is the character the user wishes to input, convenience of operation can be significantly increased. In view of the above, the present invention provides a method for previewing an output character and an electronic device. In order to make the present invention more comprehensible, embodiments are described below as the examples to prove that the invention can actually be realized.

Figure 1:
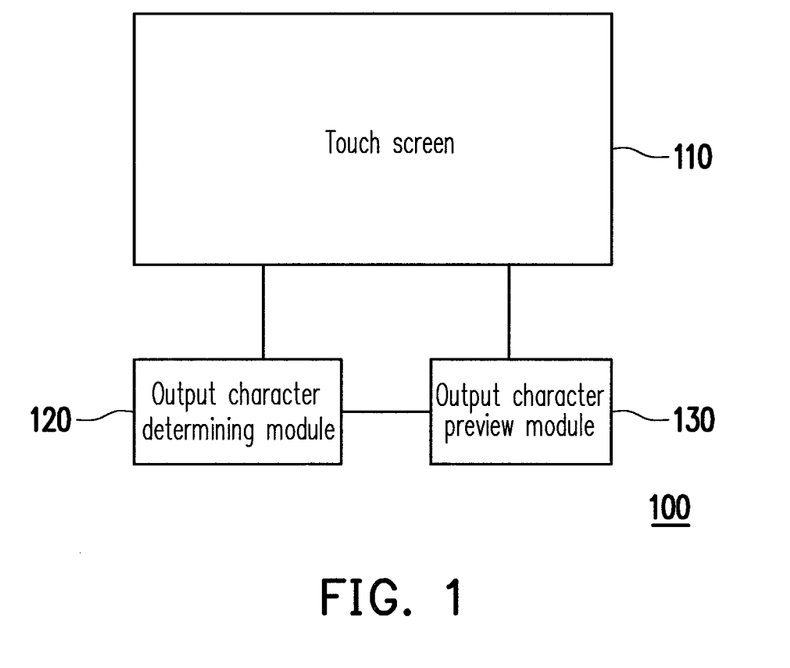
FIG. 1 is a block diagram illustrating an electronic device according to one embodiment of the present invention.

FIG. 1 is a block diagram illustrating an electronic device according to one embodiment of the present invention. Referring to FIG. 1, an electronic device 100 of the present embodiment is, for example, a cellular phone, a personal digital assistant (PDA), a smartphone, a touch phone, or a mobile computer, which is not to be limited herein. The electronic device 100 includes a touch screen 110, an output character determining module 120, and an output character preview module 130.

Figure 2A:
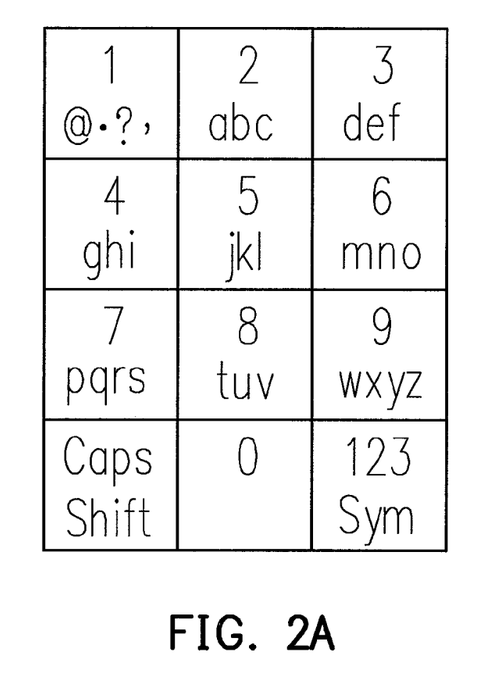
FIGS. 2A and 2B are schematic diagrams illustrating an SIP according to one embodiment of the present invention.
Figure 2B:
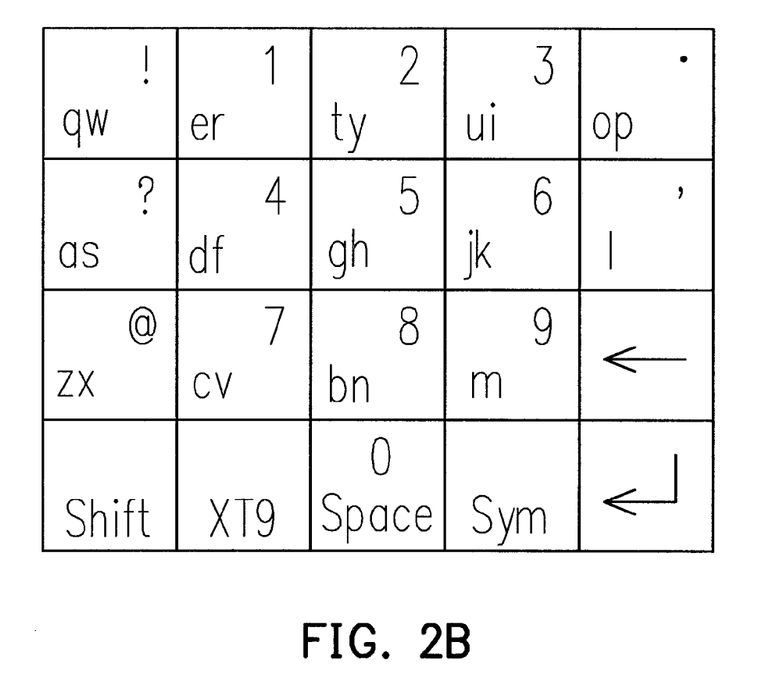

The touch screen 110 may be a resistive touch screen or a capacitive touch screen which is capable of both displaying images and receiving touch operations. In the present embodiment, the touch screen 110 includes an SIP having a plurality of keys as a phone keypad shown in FIG. 2A or a compact QWERTY keyboard shown in FIG. 2B. The present invention does not intend to limit the shape and type of the SIP. However, regardless of which type of SIP is used, a key on the SIP may be used to output more than one characters. Hence, the user is able to input necessary messages into the electronic device 100 through the SIP.

The output character determining module 120 is connected with the touch screen 110 for determining an output character about to be subsequently outputted from all characters corresponding to the pressed key (i.e. all characters that may be outputted by pressing the key) when the touch screen 110 receives at least one touch signal generated by the user pressing at least one of the keys. In the present embodiment, the output character determining module 120 may be a hardware having a processor, a software component, or a combination thereof. The present invention does not intend to limit the implementation method of the output character determining module 120.

The output character preview module 130 is respectively connected to the output character determining module 120 and the touch screen 110 for showing a display window including at least the output character and changing a display format of the output character to specifically indicate the output character. The output character preview module 130 is, for example, a hardware having a processor, a software component, or a combination thereof. By means of operations of the output character preview module 130, the user may immediately know which character is to be outputted when pressing a key on the SIP.

Figure 3:
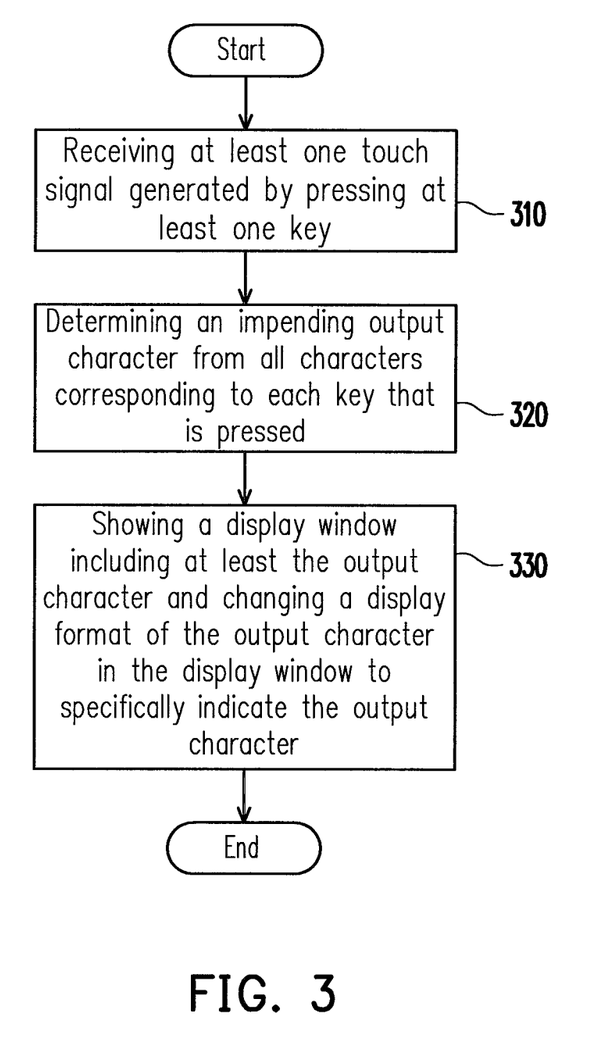
FIG. 3 is a flowchart illustrating a method for previewing an output character according to one embodiment of the invention.

In the following embodiment, a description of the flow of operations of the electronic device 100 is provided to illustrate how a proper visual feedback effect is used to enable the user to more specifically determine whether a current operation on the SIP is correct. FIG. 3 is a flowchart illustrating a method for previewing an output character according to one embodiment of the invention. Referring to both FIG. 1 and FIG. 3, when the user operates the electronic device 100 having the SIP, he/she may touch the touch screen 110 to press one or more of the keys on the SIP. Therefore, when the user needs to input a message to the electronic device 100, as shown in step 310, the touch screen 110 receives at least one touch signal generated by the user pressing at least one key.

Next in step 320, the output character determining module 120 determines an output character about to be subsequently outputted (i.e. an impending output character) from all characters corresponding to all the pressed keys. In the present embodiment, the output character determining module 120 determines the output character according to an input method currently set up in the electronic device 100.

Take a multi-tap input method as an example. Suppose characters corresponding to a key include the letters a, b, c and the number 2. When the user presses the key once, the output character outputted by the key is the letter a. From another perspective, when the user wishes to input the letter b to the electronic device 100, he/she has to press the key twice in a row so that the letter b may be the output character for the key. Similarly, when the user presses the key three or four times in a row, the output characters outputted by the key are the letter c and the number 2 in sequence. However, when the user presses the key consecutively for five times, the output character outputted by the key becomes the letter a again. In other words, the letters a, b, c and the number 2 cycle with the number of times the user presses the key. Hence, when the electronic device 100 is set up with the multi-tap input method, the output character determining module 120 counts a number of times of consecutively receiving touch signals of the key, obtains a total number of characters corresponding to the key, and then determines the output character according to the number of times and the total number of characters.

In addition, take a long-press input method as an example. When the electronic device 100 is set up with the long-press input method, as long as the user keeps pressing a key for longer than a preset length of time (e.g. 1 second), a system preset character automatically becomes an output character for the key. The preset character is, for example, one of the characters (e.g. numbers or symbols corresponding to the key) corresponding to the pressed key. Also take the corresponding letters a, b, c and number 2 as examples. Suppose the system preset output character is the number 2. After receiving the touch signal of the key, the output character determining module 120 determines the number 2 to be the output character for the key.

After the output character determining module 120 determines the output character according to the current input method of the electronic device 100, finally as shown in step 330, the output character preview module 130 shows a display window including at least the output character and changes a display format of the output character in the display window to specifically indicate the output character. Furthermore, the display window shown by the output character preview module 130 on the touch screen 110 includes at least one character (i.e. the output character) or all characters corresponding to the key. The display window also has transparency and thus does not obstruct an image or content originally displayed on the touch screen 110 at any position thereof. It should be mentioned that the output character preview module 130 shows the display window in an area outside or directly overlapping the SIP display region, for example, which is not to be limited by the present invention herein. An illustration on how the output character preview module 130 changes the display format of the output character is given below.

In one embodiment, the output character preview module 130 magnifies a font size of the output character so that the font size of the output character is different from that of the other characters in the display window. In other words, the larger character in the display window shown by the output character preview module 130 is the impending output character while the other characters are displayed according to the same preset character size in the display window. In another embodiment, the output character preview module 130 changes a font color of the output character so that the font color of the output character is different from that of the other characters which are displayed in the same preset font color in the display window. Therefore, as long as the user discovers that the font color of a certain character is different from the other characters in the display window, he/she may determine that the character is the impending output character. In addition, the output character preview module 130 may also adjust the display formats such as boldness, font type, or others display formats to enable the display format of the output character to differ from the predetermined display format so that the output character stands out from the other characters. The present invention does not limit the types of the display formats to be changed.

By changing the display format to specifically indicate the impending output character, the user can clearly know which key is pressed and immediately confirm the content to be outputted by the key when using the SIP to input a message into the electronic device 100. As such, the probability that the user inputs an incorrect message to the electronic device 100 can be significantly decreased and thus convenience of use is increased.

Figure 4A:
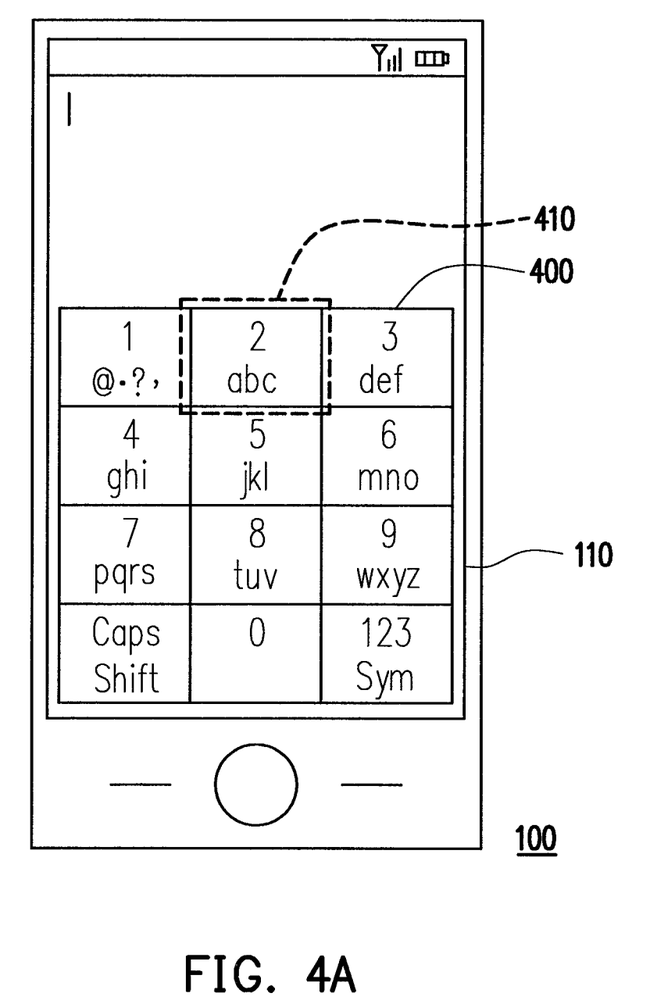
FIGS. 4A, 4B, and 4C are schematic diagrams illustrating external views of an electronic device according to one embodiment of the present invention.

In the following embodiment, suppose the exterior of the electronic device 100 is as shown on FIG. 4A. When the user starts an application requiring message input (e.g. a text message editing application), the touch screen 110 displays an SIP 400 including 12 keys, for example. As shown in FIG. 4A, letters, numbers, and symbols marked on each key are the characters that may be outputted when the user presses each of the keys. For example, when the user presses a key 410, the key 410 may output one of the letters a, b, c, and the number 2.

If the electronic device 100 is set to use the multi-tap input method, when the user presses the key 410 once, the output character determining module 120 determines the impending output character by the key 410 is the letter a. Accordingly, the display window shown by the output character preview module 130 is as illustrated by a display window 420 of FIG. 4B. In the display window 420, the font size of the letter a as adjusted by the output character preview module 130 is obviously larger than other characters (i.e. letters b, c and number 2) corresponding to the key 410. Therefore, the user can easily determine that the character to be outputted is the letter a.

However, if the user presses the key 410 twice in a row, the output character determining module 120 determines that the character to be outputted by the key 410 is the letter b. Hence, the output character preview module 130 adjusts the display format of the letter b. The adjusted result is as illustrated by a display window 430 in FIG. 4C. The font size of the letter b is larger than other characters (i.e. letters a, c and number 2) corresponding to the key 410.

Figure 4B:
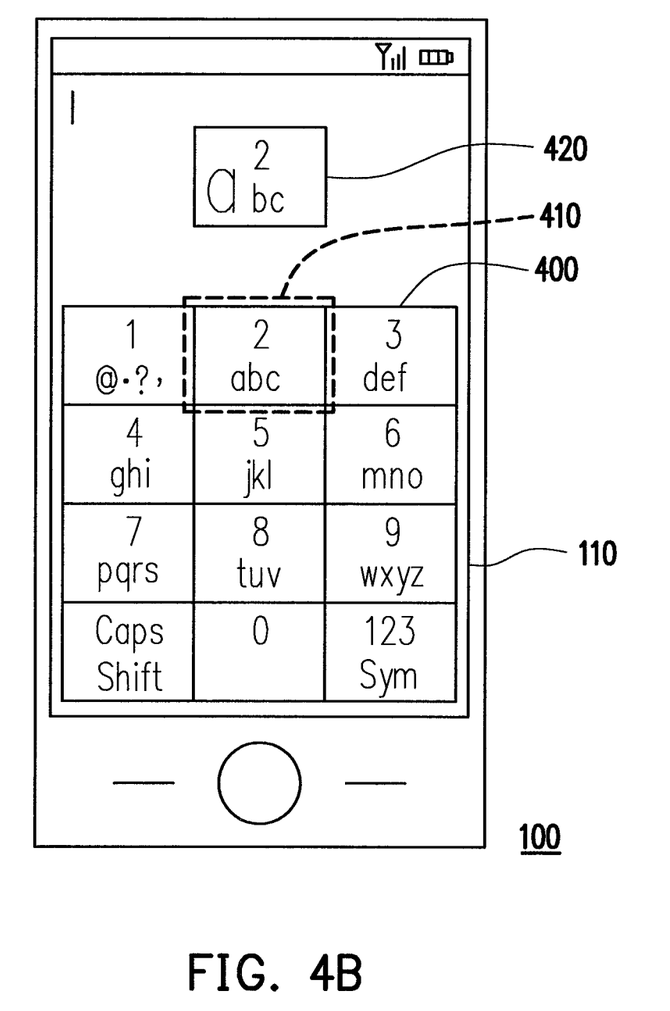
Figure 4C:
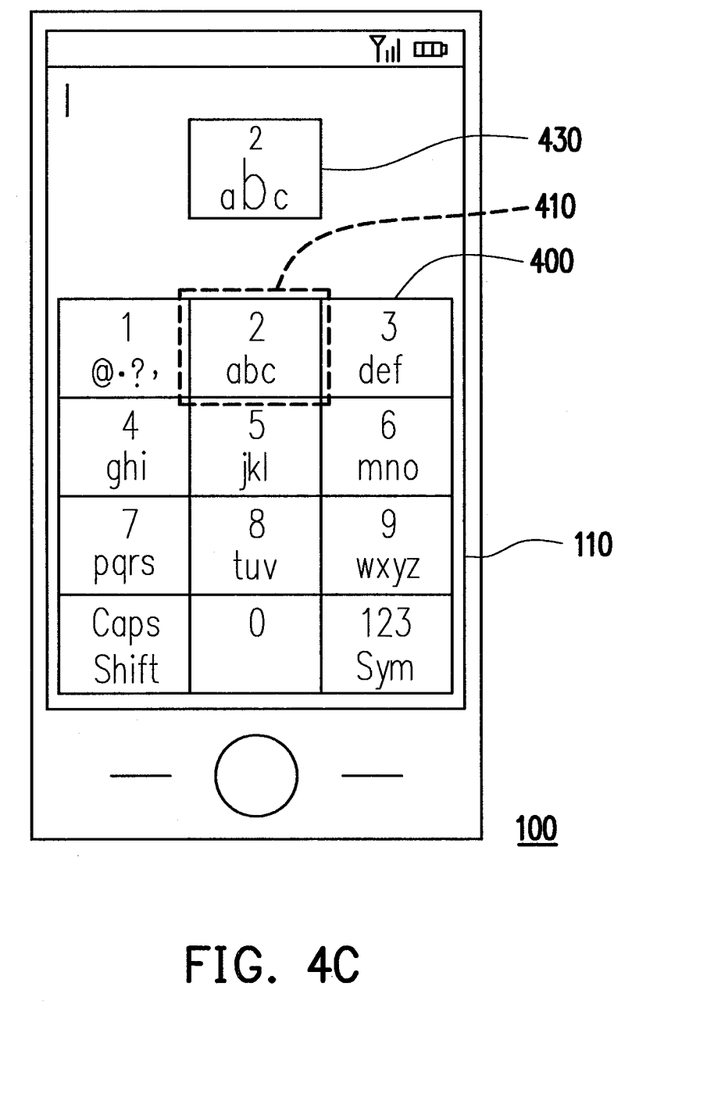

In the above embodiment, as soon as the user presses a key on the SIP 400, the output character preview module 130 shows a display window (e.g. the display window 420 and the display window 430) on the SIP 400 so as to enable the user to view all the characters corresponding to the key by means of the display window and know the character to be outputted in advance. In addition, the display window is shown on a region upper than the SIP 400 and thus will not be obstructed by the user's finger (or an input apparatus such as a stylus). Such visual feedback effects help the user perform operations on the SIP with more convenience and thus significantly increase efficiency.

It should be noted that the abovementioned output character preview method may be implemented on any electronic device having a touch screen. In other words, the abovementioned embodiment is designed to be a computer program including a plurality of program codes. The computer program is stored in a computer readable storage medium (e.g. an optical disk, a floppy disk, or a removable hard disk) and may execute the output character preview method of the abovementioned embodiment on the electronic device after being loaded in the electronic device.

In summary, the method for previewing an output character, electronic device, and recording medium thereof provided in the present invention can display all characters corresponding to a pressed key and can specifically indicate the character to be outputted by the key. As such, the user can easily determine whether a correct key has been pressed and confirm whether the character to be outputted is the character required to be inputted in the electronic device. Thus, convenience of inputting a message into the electronic device by means of the SIP is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for previewing an output character, for an electronic device displaying a software input panel (SIP), wherein the SIP includes a plurality of keys, each of the keys is used to output at least one character, and the method comprises:
   receiving a first touch signal generated by pressing a key of the plurality of keys, wherein in response to the key being pressed according to a multi-tap input method, executing at least:
   showing a display window to display characters corresponding to the pressed key, wherein the characters comprise a plurality of alphabetic characters and a numeric character;
   indicating an alphabetic character by changing a display format of the alphabetic character of the characters in the display window;
   receiving a second touch signal on the same pressed key within a predetermined period; and
   indicating a numeric character in response to receiving the second touch signal on the same pressed key by changing a display format of the numeric character of the characters in the display window, and wherein
   in response to the key being pressed according to a long-press input method by pressing the key for longer than a predefined length of time, at least displaying a preset character in the display window, wherein the predefined length of time is 1 second.

2. The method for previewing an output character according to claim 1, wherein the step of determining the output character comprises:
   determining the output character according to an input method currently set in the electronic device.

3. The method for previewing an output character according to claim 2, wherein when the input method is a long-press input method, a step of determining the output character comprises:
   obtaining a preset character as the output character, wherein the preset character is one of the characters corresponding to the key.

4. The method for previewing an output character according to claim 1, wherein the step of indicating the alphabetic character or the numeric character by changing the display format of the alphabetic character or the numeric character in the display window to specifically indicate the output character comprises:
   magnifying a font size of the alphabetic character or the numeric character so that the font size is different from a font size of the other characters in the display window.

5. The method for previewing an output character according to claim 1, wherein the step of indicating the alphabetic character or the numeric character by changing the display format of the alphabetic character or the numeric character in the display window to specifically indicate the output character comprises:
   changing a font color of the alphabetic character or the numeric character so that the font color is different from a font color of the other characters in the display window.

6. The method for previewing an output character according to claim 1, wherein the step of showing the display window comprises:
   showing the display window in an area outside the SIP.

7. The method for previewing an output character according to claim 1, wherein the step of showing the display window comprises:
   showing the display window in an area overlapping an area displaying the pressed key.

8. The method for previewing an output character according to claim 1, wherein the display window has transparency.

9. An electronic device, comprising:
   a touch screen, for displaying an SIP having a plurality of keys, each of the keys is used for outputting at least one character;
   an output character determining module, coupled to the touch screen, and determines the output character based on at least receiving a first touch signal and receiving a second touch signal within a predetermined period of receiving the first touch signal and based on receiving the first touch signal for longer than a predefined length of time; and
   an output character preview module, coupled to the output character determining module and the touch screen, wherein
   in response to the touch screen receiving the first touch signal generated by pressing a key of the plurality of keys but for less than a predefined length of time, the output character preview module shows a display window including characters corresponding to the pressed key, wherein the characters comprise a plurality of alphabetic characters and a numeric character;
   the output character preview module indicates an alphabetic character of the characters by changing a display format of the alphabetic character in the display window; and
   in response to receiving the second touch signal on the same pressed key within a predetermined period of receiving the first touch signal on the pressed key, the output character preview module indicates a numeric character of the characters in response to receiving the second touch signal on the pressed key by changing a display format of the numeric character in the display window and;
   in response to receiving the first touch signal for longer than the predefined length of time, displaying a preset character in the display window, wherein the predefined length of time is 1 second.

10. The electronic device according to claim 9, wherein the output character determining module determines the output character according to an input method currently set up in the electronic device.

11. The electronic device according to claim 10, wherein when the input method is a long-press input method, the output character determining module obtains a preset character as the output character, the preset character being one of the characters corresponding to the key.

12. The electronic device according to claim 9, wherein the output character preview module magnifies a font size of the alphabetic character or the numeric character so that the font size is different from a font size of the other characters in the display window.

13. The electronic device according to claim 9, wherein the output character preview module changes a font color of the alphabetic character or the numeric character so that the font color is different from a font color of the other characters in the display window.

14. The electronic device according to claim 9, wherein the output character preview module shows the display window in an area outside the SIP.

15. The electronic device according to claim 9, wherein the output character preview module shows the display window in an area overlapping an area displaying the pressed key.

16. The electronic device according to claim 9, wherein the display window has transparency.

* * * * *